UNITED STATES PATENT OFFICE.

GEORGE L. PATTERSON, THOMAS L. MORNES, AND CARL H. ZIEME, OF NEW CASTLE, PENNSYLVANIA.

METHOD OF GALVANIZING.

No. 928,398.  Specification of Letters Patent.  Patented July 20, 1909.

Application filed November 4, 1907. Serial No. 400,456.

*To all whom it may concern:*

Be it known that we, GEORGE L. PATTERSON, THOMAS L. MORNES, and CARL H. ZIEME, all of New Castle, Lawrence county, Pennsylvania, have invented a new and useful Improvement in the Methods of Galvanizing, of which the following is a full, clear, and exact description.

Our invention relates to coating iron or steel articles or surfaces with zinc, and is designed to overcome certain difficulties connected with previous methods for this purpose.

In hot galvanizing, the process is expensive owing to the large amount of zinc used, in electro-galvanizing the surfaces are liable to corrosion and oxidation due to the zinc coating not being closely adherent to or amalgamated with the iron or steel surface. The other process known as "sherardizing" is not commercially practical in many cases.

Our invention provides a coating which is substantially equal in quality to the electrolytic coating, while it is much more closely adherent to the iron or steel surface, and is less liable to corrosion.

In carrying out our process, we apply a slip or wet paste of zinc dust mixed up with a carrier and a liquid such as water, to the iron or steel surface to be coated, and then heat the article to cause the zinc to form a closely adherent uniform coating over the article.

In the preferred form of our invention, we immerse or dip the article to be galvanized, which has first been cleaned if necessary, by pickling or sand blasting, or a similar process, in the slip or liquid paste, which is preferably composed of commercial zinc flue dust, clay, finely divided carbon, and water. The proportions of this slip may be widely varied in accordance with the nature of the deposit desired, and the fluidity of the paste. We have found in practice that 88 parts by weight of zinc flue dust, two parts by weight of lamp black, and 10 parts by weight of clay, ground and mixed with a sufficient amount of water to produce a smooth flowing slip, form an excellent mixture for average use. The amount of carbon may be varied in accordance with the condition of the zinc dust, especially in relation to the amount of oxid present. The coated article may then be dried, or at once placed without drying in an inclosed vessel of any desired shape, this vessel being preferably closed to avoid direct oxidation as much as possible. The receptacle, which may be the annealing pot, is then placed in a suitable furnace and subjected to a heat which is preferably between 600 and 1,000 degrees Fahrenheit. The amount of heat may be varied in accordance with the nature of the deposit desired, although a higher or lower heat may be employed. This heating is preferably continued for a period varying ordinarily from one-half an hour to four hours, depending upon the mass of metal to be heated. The vessel is then removed from the furnace and cooled, preferably under conditions which are free from oxidizing influences. When the pot or receptacle has cooled down, the articles are removed therefrom, and any adhering scale or clay and residual zinc may be brushed off or otherwise removed. The article can then be polished or burnished in the ordinary manner.

The advantages of our invention result from the high character of the coating, its being closely adherent to and substantially amalgamated with the surface of the iron or steel, and also from the cheapness and ease of application of the process. The deposit of zinc formed by our process resembles that produced by electrolysis but is firmly bound and secured to the underlying metal, and hence less subject to corrosion. The process is free from any mechanical difficulties present in former processes, and much less zinc dust is employed than in the sherardizing process. The workmen are not subjected to the influences of dry zinc dust during the coating operations, and the cooling down is much more rapid owing to the absence of the large mass of zinc dust as in sherardizing. There is also no danger from excessive oxidation and explosions caused thereby when the receptacle is open.

Instead of the ordinary commercial flue dust, we may employ specially prepared zinc dust; another vehicle or carrier may be used instead of the clay for preventing settling of the zinc dust in the liquid; and other liquids than water may be employed in making up the slip the vehicle being preferably a refractory chemically non-reactive material that can be reduced to pulverulent or finely divided form so that it will hold the metal and the reducing agent in the presence of the metal in a distributed condition; and the liquid being such as will make, with the vehicle and suspended metal, a slip or paste into which the object may be dipped or which may be otherwise brought into contact with the article to cause a coating of the vehicle with the suspended metal and reducing agent to adhere to the object until the object can be subjected to the necessary heat to deposit the metal.

Other changes may be made without departing from our invention, since

We claim:—

1. The method of coating a metal object with zinc, which consists in bringing into the presence of the surface to be coated zinc in the form of flue dust thoroughly mingled with finely divided clay in a suitable liquid, constituting the herein described inert and chemically non-reactive vehicle, together with a reducing agent, and then subjecting to heat.

2. The method of galvanizing, consisting in applying to the surface to be coated a slip or liquid mixture containing zinc dust, a liquid vehicle therefor, and finely divided carbon, and then heating the surface so coated; substantially as described.

3. The method of galvanizing, which consists in making a liquid mixture or slip consisting of finely divided clay and water, and containing zinc dust, and a reducing agent, then painting the surface to be coated with the liquid mixture, and then heating the same.

4. The herein described method of coating with metal, which consists in mixing finely divided clay, a metal to be deposited as a coating, and a carbonaceous material, together with a suitable liquid and then applying the mixture to the object to be coated and then subjecting the object to heat.

5. The improved art of depositing a surface metal upon an object to be surfaced, which consists in first suspending the metal in partially oxidized form, in the presence of a reducing agent such as carbon, by mixing such metal and reducing agent in a fluid slip consisting of finely divided clay or equivalent refractory substance, and a liquid, then distributing the metal with the reducing agent, over the object to be surfaced, by dipping the object in the slip, and then withdrawing the object and subjecting it, with the coating adhering thereto, to the action of heat.

In testimony whereof, we have hereunto set our hands.

GEORGE L. PATTERSON.
THOMAS L. MORNES.
CARL H. ZIEME.

Witnesses:
W. W. CUBBISON,
W. W. FRANTZ.